United States Patent
Staudenmann et al.

(10) Patent No.: US 7,543,488 B2
(45) Date of Patent: Jun. 9, 2009

(54) SENSOR FOR MEASURING A LENGTH OR AN ANGLE

(75) Inventors: Christian Staudenmann, Buchs SG (CH); Daniel Brunnschweiler, Fläsch (CH)

(73) Assignee: Thyssenkrupp Presta AG, Eschen (LI)

( * ) Notice: Subject to any disclaimer, the term of this patent is extended or adjusted under 35 U.S.C. 154(b) by 488 days.

(21) Appl. No.: 10/556,997

(22) PCT Filed: May 10, 2004

(86) PCT No.: PCT/CH2004/000281
§ 371 (c)(1),
(2), (4) Date: Nov. 15, 2005

(87) PCT Pub. No.: WO2004/102123
PCT Pub. Date: Nov. 25, 2004

(65) Prior Publication Data
US 2006/0243519 A1    Nov. 2, 2006

(30) Foreign Application Priority Data
May 17, 2003    (CH) .................................. 0874/03

(51) Int. Cl.
B62D 15/02   (2006.01)
G01B 21/22   (2006.01)
G01D 5/249   (2006.01)
G01D 5/347   (2006.01)

(52) U.S. Cl. .................................. 73/117.02; 180/400
(58) Field of Classification Search ............ 73/117.02, 73/865.9; 180/400, 443, 444
See application file for complete search history.

(56) References Cited

U.S. PATENT DOCUMENTS

| | | | | |
|---|---|---|---|---|
| 4,856,607 A * | 8/1989 | Sueshige et al. | ............ | 180/422 |
| 5,014,801 A * | 5/1991 | Hirose | ........................ | 180/412 |
| 5,539,993 A * | 7/1996 | Kilpinen et al. | ................ | 33/706 |
| 5,957,987 A * | 9/1999 | Sudo et al. | ..................... | 701/41 |
| 6,389,342 B1* | 5/2002 | Kanda | ..................... | 180/443 X |
| 6,619,421 B2* | 9/2003 | Tanioka | ...................... | 180/444 |
| 7,129,660 B2* | 10/2006 | Fujita et al. | .................. | 318/434 |

FOREIGN PATENT DOCUMENTS

| | | | |
|---|---|---|---|
| DE | 4436784 A1 * | 4/1995 | |
| DE | 10104855 A1 * | 5/2002 | |
| DE | 10350666 A1 * | 10/2004 | |
| DE | 102004012377 A1 * | 9/2005 | |
| JP | 63068469 A * | 3/1988 | |
| JP | 04038419 A * | 2/1992 | |
| WO | WO 02084223 A1 * | 10/2002 | |

* cited by examiner

*Primary Examiner*—Thomas P Noland
(74) *Attorney, Agent, or Firm*—Notaro & Michalos P.C.

(57) ABSTRACT

An electric servo steering arrangement and method for motor vehicles with a rotational angle sensor configuration for acquisition of the position of the steering movement has a support plate rotating relative or corresponding to the steering movement, with at least one code track and at least one stationary sensor acting on the code track. The code track is disposed about the rotational axis of the support plate and has markings for generating a sequentially changing bit pattern and the 360° of the circumference divided by the number of markings on the circumference defines a clock angle ($\beta$). The bit pattern is determined by a phase-shifted disposition of markings with respect to the fixed division of the clock angle ($\beta$).

17 Claims, 5 Drawing Sheets

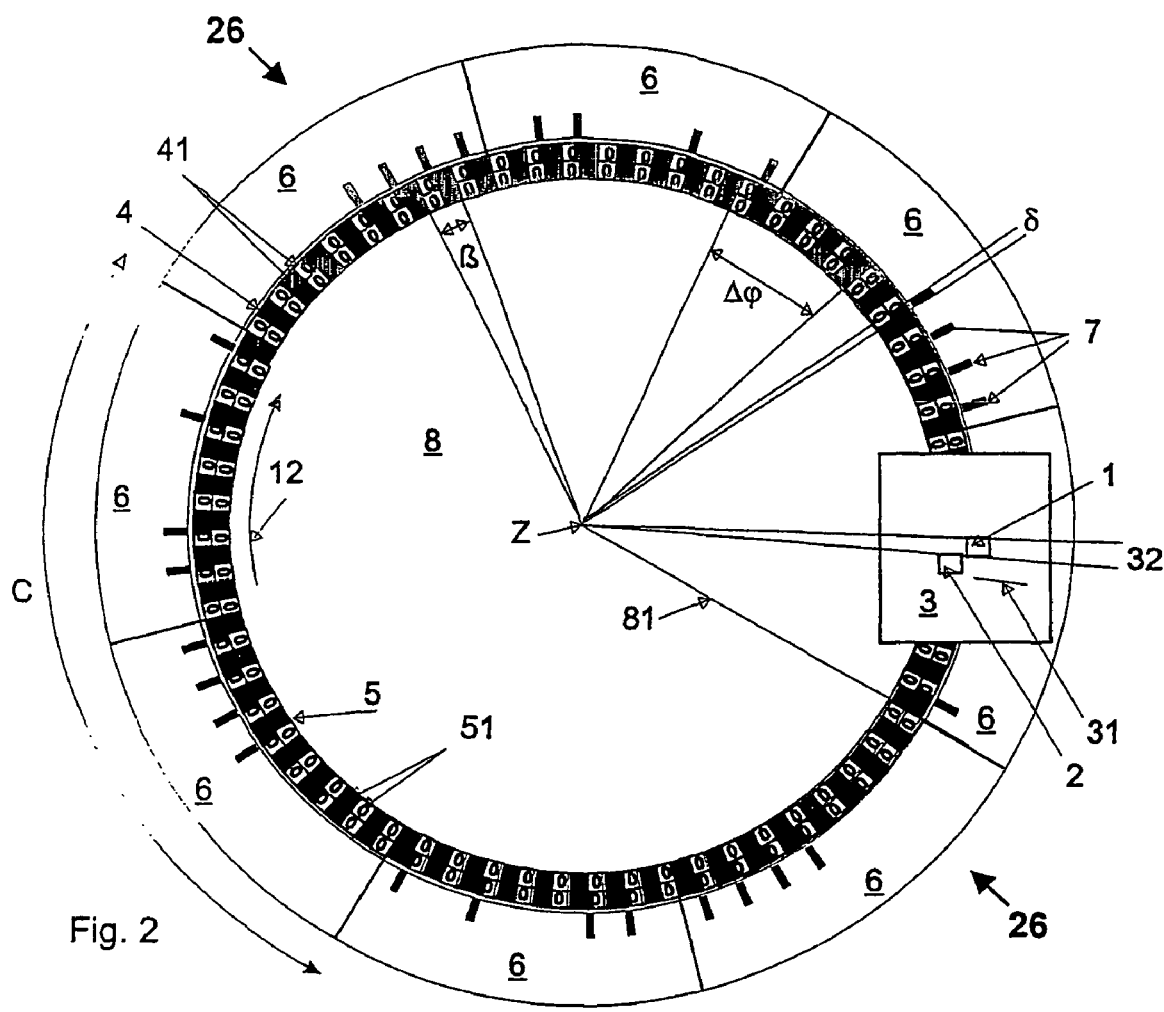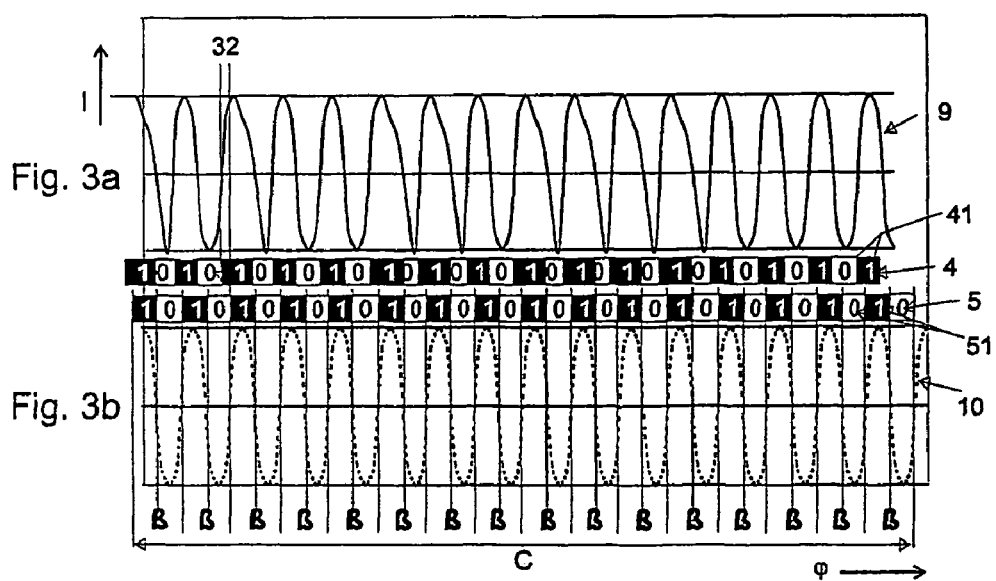

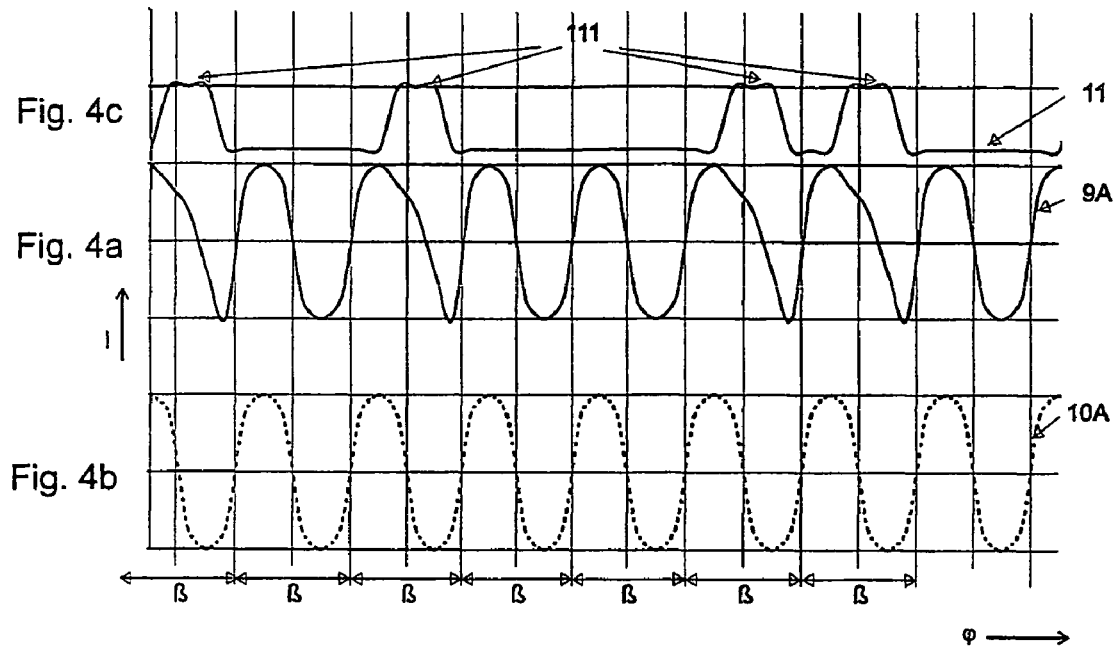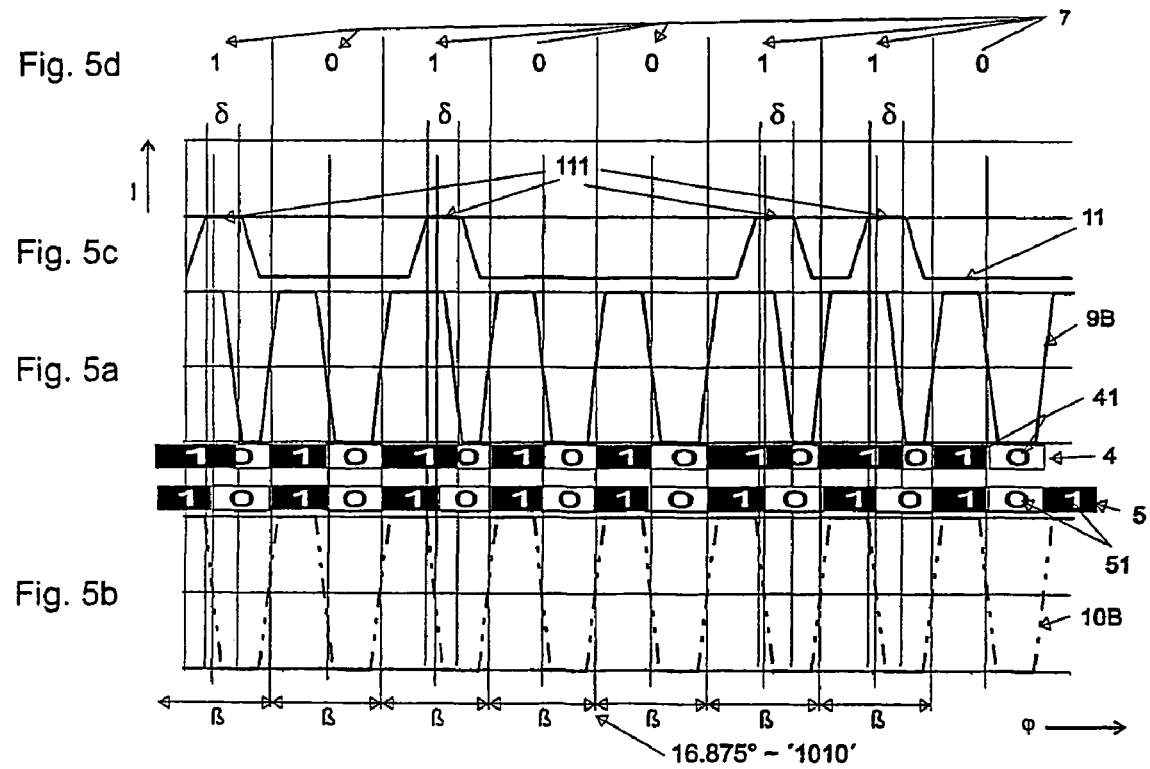

SENSOR FOR MEASURING A LENGTH OR AN ANGLE

FIELD AND BACKGROUND OF THE INVENTION

The invention relates to an electric servo-steering arrangement for motor vehicles with a rotational angle sensor configuration as well as to a method as well as to a method therefore.

The invention addresses a steering arrangement for motor vehicles with power-assisted drive, in which via a rotational angle sensor a desired steering movement is detected, via regulation devices a theoretical-actual deviation is determined, thereupon a required adjustment moment is calculated and the appropriate power is supplied to the power-assisted drive.

Various steering arrangements of this type are known in prior art. In particular, in recent times there are increasingly found steering arrangements with electric power-assisted drive (DE 10141199A1) or, circumventing the mechanical coupling between steering wheel and wheels, with direct electric drive of the steering adjustment of the wheels.

For measuring the angle in prior art, Hall sensors are frequently employed. Therein onto the rotatable part magnetic elements are fastened, whose polarity changes in a fixed time pattern. A Hall probe correspondingly picks up the Hall voltage caused by the alternation of the magnetic field and outputs counter pulses. By counting out the counter pulses the difference angle can be determined. Only through the marking of a start point, for example marked by several pulses with same polarity or by an additional sensor configuration, can the absolute rotational angle be determined. In alternative embodiments, such as for example introduced in DE 101 04 855 A1, the sequence of the counter pulses is utilized as additional information. However, in this case three sensors are required.

In comparison with the utilization of analog signals, the counting of counter pulses offers the advantage that the signal-to-noise ratio is significantly increased, which means interferences have a lesser effect on the quality of the signal analysis.

Apart from the known advantages of such steering arrangements, such as for example the low energy consumption or the capacity for good adaptation to the desired steering behavior of the motor vehicle, there is, however, a large number of new problems to be resolved.

In the first instance the response behavior and the precision of the wheel angle of the steering arrangement must be at least as good as in a conventional mechanical steering arrangement with hydraulic steering booster. Derived therefrom are several requirements made of the steering arrangement. First, the driver's desire, which means the desired wheel angle must be determined by the steering arrangement. The angle determination of the rotating components of the device with respect to the non-rotating components must take place with certainty and rapidly. Subsequently, from the measured values rapidly and with certainty the necessary power introduction into the electric power-assisted drive must be determined. Furthermore, the power assist or the electric drive, while circumventing the mechanical coupling, must be fed with minimum loss into the steering gearing. Lastly, the actually attained steering angle must be measured in order to close the positioning regulation circuit. Placed under the positioning regulation circuit, the regulation circuit for the power control of the electronically commutated electric motor must be closed.

However, the known systems have several distinct disadvantages. Thus, absolute values of the angles can only be acquired after passing through a relatively large angular range, for example, one complete rotation. Furthermore there is the risk of missing a marked starting point or a counter pulse, such that the angle measurement is erroneous. Moreover, a starting point must be defined. This leads either to a decrease of the resolution in the proximity of the starting point through the use of a longer pulse duration or to the need for a separate starting point detection sensor. In addition, most systems require several sensors, to some extent even more than 2 sensors, for acquiring the angular position.

The present invention addresses the problem of eliminating the disadvantages of prior art. The problem addressed comprises, for one, to bring into agreement the commutation of the current flow with the rotational position of the motor and, for another, to carry out the regulation very rapidly and smoothly so that no torsional fluctuations are introduced into the steering system, which are perceived by the driver as weaving or shimmy during the steering. This means that the angle of the rotor with respect to the stator of the electric motor must be acquired rapidly and with certainty. In addition the configuration must be reliably, simply and economically realizable.

The subject matter of the invention deals with the acquisition by sensory means of the rotor angle as a basis for the optimal regulation of the steering system, in particular of the electronic control of the electric motor.

The invention solves the problem of the sensory acquisition of the angles between the rotationally moved components with respect to the non-rotationally moved components through an arrangement according to the invention in simple manner and with comparatively low sensor expenditure. The dependent claims indicate further preferred embodiments. The invention includes the method for the solution of the problem.

SUMMARY OF THE INVENTION

According to the invention the electric servo-steering arrangement for motor vehicles comprises a rotational angle sensor configuration for acquiring the position of the steering movement, such configuration comprising a support plate rotating relative or corresponding to the steering movement, with at least one code track and at least one stationary sensor operating on the code track, wherein the code track is disposed circularly about the rotational axis (Z) of the support plate and comprises markings for generating a successively changing bit pattern and the 360° of the circumference divided by the number of the markings on the circumference defines a clock angle ($\beta$) and the bit pattern is determined by a phase-shifted configuration of markings with respect to the fixed division of the clock angle (β). The selected markings (41) are herein advantageously applied on the support plate (8) at some predefined sites at an offset (δ), such that the bit pattern at these sites changes with delay with respect to the clock (β).

A preferred electric servo-steering arrangement according to the invention includes a sensor configuration with two parallel or concentric code tracks, such as will be described in further detail in the following.

The readings recorder comprises a sensor unit, which is fixedly disposed with the non-rotating component, comprised of two sensors and two code tracks, associated with the sensors and connected with the rotatable component, on a support plate. On each of the two code tracks can be found an alternating '1'/'0' pattern at an equidistant angular spacing for generating digital signals. The '1'/'0' patterns of the two code tracks are disposed exactly equally with respect to one another. This means that if for a specific angular position the pattern of the one code track just then changes from '1' to '0', the pattern of the other code track changes exactly in the same direction. The pattern can preferably be formed by permanent magnets or with a magnetization, for example with a corresponding North-South polarity or through a dot mask or also by other comparable means, depending on the type of sensor employed. The sensors can be, correspondingly in the case permanent magnets are employed, Hall sensors or for dot masks simple optical transmitted light sensors comprised of light source and photosemiconductor. In the case of the preferred utilization of permanent magnets for the representation of code tracks, a broad code track can simply be applied as a two-dimensional code track pattern, which at different spacings, viewed from the point of rotation, are scanned by two sensors.

The utilization of two different sensors with two associated code tracks serves primarily for two important purposes. For one, the one code track through the uniform disposition of the markings provides a fixed clock interval in relation to the angle of rotation. For another, the two sensors are disposed minimally offset with respect to one another. Thereby the change of the signal, caused by the change from marking '0' to '1', is detected first in one of the two signals of the two code tracks. Therefrom the direction of rotation of the support plate can subsequently be determined.

According to the invention on one of the two code tracks at some predefined sites the alternating '1'/'0' pattern does not change in precisely equidistant angular spacings, but rather slightly delayed or offset. This means that this particular selected marking is applied at an offset onto the support plate. With these changes, which are delayed with respect to the clock interval, a specific pattern can again be formed. The utilization of this pattern subsequently permits the rapid determination of the absolute angular position. After the first passage of a previously determined magnitude of the angular change, the initial detection angle, which corresponds to the pattern length, the absolute value of the angle within a specified coding length with respect to the zero position and multiples of the coding length can subsequently be determined.

The pattern length should always comprise the same angle lengths, i.e. the same number of clock intervals, but should comprise different numbers of offsets of markings. The possible generated patterns and their assignment to fixed angle values are deposited in a data store in the form of a truth table or the patterns are such that they can be mathematically converted to the particular angle. For this purpose the currently customary electronic stores and processors can advantageously be utilized. It is here especially preferred if the bit pattern determined by the phase-shifted disposition of markings on the code track change during the rotation of the support plate with each clock (β) and this disposition is unique and unambiguous in order to be able to identify the position immediately and unambiguously. These specified unambiguous patterns or words are deposited in the store and can subsequently be compared with the actual pattern of the coding, based on which the position can be determined.

It can moreover be advantageous if the markings not disposed at an offset are disposed at a partitioning of half a clock (β/2).

The advantage of the method according to the invention comprises that after the first passage through several changes of the marking up to the passage of the defined angle change—the start detection angle—the precise angle value can already be determined immediately with each further change of the marking.

In a further development of the invention the clock signal of one of the two code tracks is omitted. This clock is subsequently determined after the passage through several changes of the marking of the remaining code track, for example through simple division of the number of changes divided by the elapsed time. The offsets of the markings are subsequently referred to the clock calculated thus and further processed in the same manner. Determination of the direction of rotation either takes place through a truth table, which contains the direction of rotation, or through an offset of the markings, in which the start of the '1' as well as also the end of the '1' is delayed with respect to the clock. Thereby, for example through simple difference formation of the sensor signal and the sensor signal constructed from the clock, a pattern with positive and negative signal peaks can be generated. The direction of rotation is determined directly based on the simple test of whether the positive or the negative signal peaks are generated first.

In all embodiments of the method according to the invention the real sensor signal form(s) can additionally be sampled. Hereby the signal change can be resolved further and even more precisely. Through the sampling of the signals further edge changes can be generated, based on the counting of which intermediate values for the angle can be determined. The measuring resolution can thereby be increased further.

The aim of all measures shown in the invention is to determine the angle as rapidly and precisely and with as much certainty as possible. For this purpose, on the one hand, the physical limits with respect to producible geometric values of corresponding markings and to the signal-to-noise ratio and further factors must be observed. Depending on the resolution, the acquisition of the angles in digital computers requires words of different lengths. Through the correct size of the word length, for example 4 bits or 8 bits, the computing speed can be significantly affected. It is necessary to differentiate between the word length for the computing operations as well as also for storage operations. The optimum layout depends on the architecture of the hardware and through the introduced measuring methods can be harmonized with the required measuring resolutions and speeds. As parameters for this purpose serve the length of the truth table, the sampling rate with respect to the rotational speed, diameters and geometric dimensions of the markings and further variables.

The same method is applicable not only for the preferred angle of rotation measurement but is also suitable for length measurements. In this case the rotation must be replaced by a translation and the angle reference by a length reference. The rotatable component is in this case a longitudinally displaceable component and the angle units and angle offsets are correspondingly units of length and offsets of length. For code track configurations with the associated sensors magnetic means are especially suitable and consequently preferred. However optical, capacitive or inductive means or their combinations can also be utilized.

A special application case for the utilization of the angle measurement comprises the determination of the angle of the rotor with respect to the pole shoes of the stator of an electric motor, for the application as electric power-assist in a steering system (servo-steering). This is especially important for the correct and precise control of electronically commutated motors. Primarily during the start-up of the motor the correct direction of rotation must be ensured. The coding length can here advantageously be set equal to the angle of one or more pole shoes.

The utilization of the bearing cover of the gearing arrangement, such as in particular when utilizing a ball screw, as the support plate of the code tracks is especially advantageous.

The various features of novelty which characterize the invention are pointed out with particularity in the claims annexed to and forming a part of this disclosure and are entirely based on the priority application number CH874/03 filed May 17, 2003 in Switzerland.

BRIEF DESCRIPTION OF THE DRAWINGS

On the preferred example of utilizing permanent-magnet markings on the code tracks and the utilization of Hall sensors, the method for signal processing and analyzing will be shown in conjunction with schematic figures. In the drawing depict.

DESCRIPTION OF THE PREFERRED EMBODIMENTS

All of the illustrations in FIGS. 2, 3, 4, 5, 7 and 8a refer to one and the same example. FIG. 6 is only intended to demonstrate the option of a signal analysis of positive signal peaks 111 and negative signal peaks 112. In FIGS. 8b, 8c and 8d examples of other variants of the coding are shown in order to provide a reference of the way in which, after the specification of the coding length C and of the start detection angle $\Delta\phi$, a scheme for suitable angle offsets $\delta$ on the two code tracks 4, 5 can be found and therewith a suitable definition of the markings 41, 51.

In the representation of the digitized signals the signal edge is clearly shown in the particular figures. The rise is determined by the particular electronic circuitry utilized. However, the rise of the signal edge is of subordinate significance for the analysis. Therefore in the illustrations the representation of the edges as being infinitely steep has been omitted.

Figure 1:
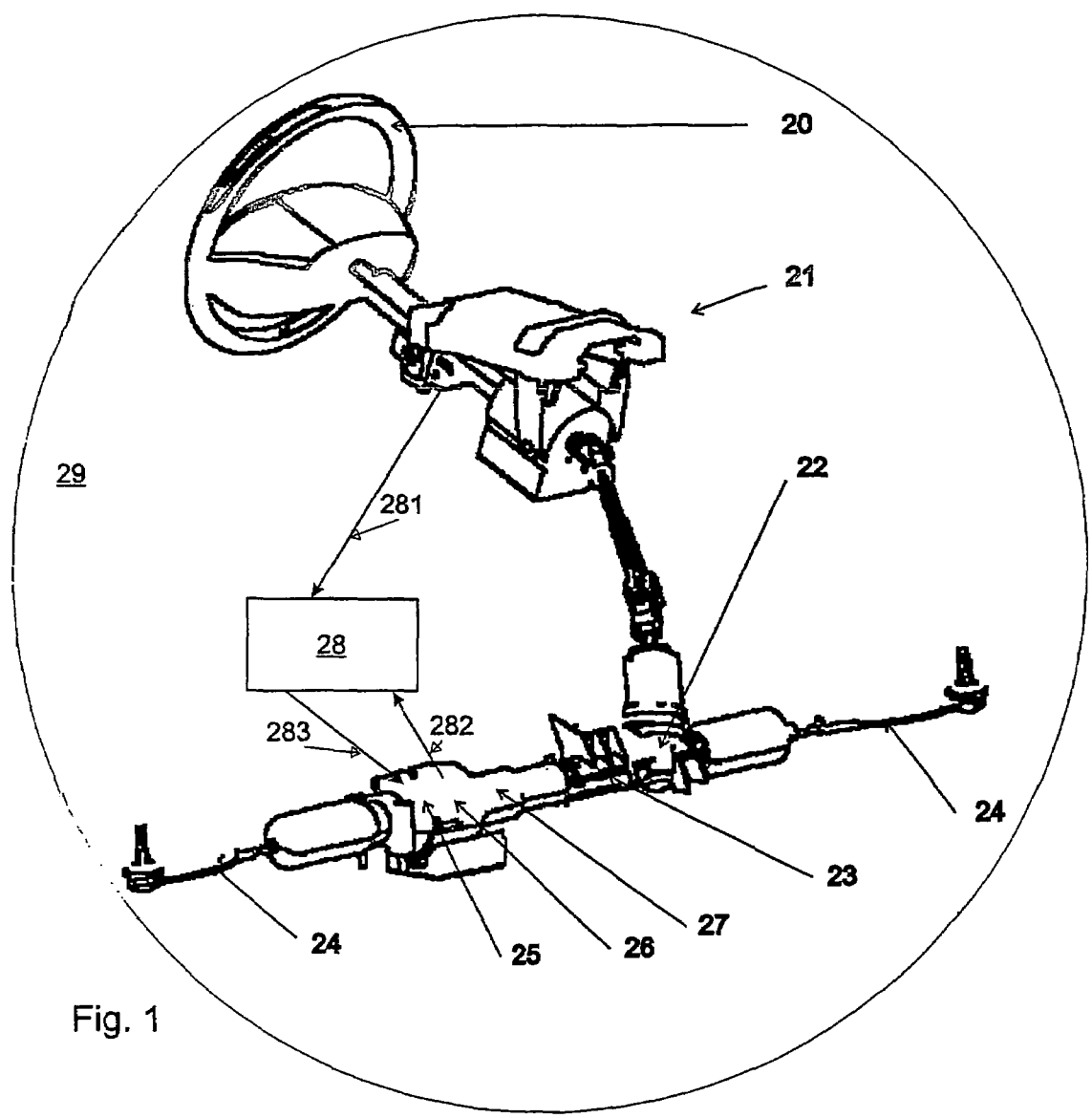
FIG. 1 the schematic structure of a steering arrangement with power-assisted booster, FIG. 2 the disposition of the sensor configuration, its position with respect to the pole shoes of the electric motor and the schematic assignment to the signal code bits, FIG. 3 comprised of FIGS. 3a and 3b, the signal traces of the Hall signals as well as the reference to the markings on the code tracks, FIG. 4 comprised of FIGS. 4a, 4b and 4c, the signal traces of the Hall signals purged of the angle offset of the two sensors and the combination signal, FIG. 5 comprised of FIGS. 5a, 5b, 5c and 5d, the signal traces of the digitized Hall signals purged of the angle offset of the two sensors, as well as the reference to the markings on the code tracks and the combination signal as well as the signal code bits, FIG. 6 for another example the signal traces of the digitized Hall signals purged of the angle offset of the two sensors and the digitized combination signal, FIG. 7 a truth table for determining the instantaneous angle, and FIG. 8 comprised of FIGS. 8a, 8b, 8c and 8d, shows other examples for coding with the associated truth tables.

The schematic structure of a steering arrangement 29 with power-assisted booster shown in FIG. 1 corresponds substantially to prior art. It comprises inter alia a steering wheel 20, a steering column 21, steering gearing 22 and two tie rods 24. The tie rods 24 are driven by a toothed rod 23. For the power-assisted booster serves the drive unit formed of the components servo motor 25, sensor configuration 26 and ball screw 27. The invention relates to the sensor configuration 26 and, in the specific further development, in the disposition in a steering arrangement for a motor vehicle. Therein the driver's desire is fed through the steering wheel 20 via (not shown) sensor circuitry as signal 281 into a control device 28. From the sensor configuration 26 the sensor output signal 282, the instantaneous angle of rotation and, derived therefrom, the steering angle is fed into the control device 28. In the control device, the corresponding control voltage 283 for the electric motor or servo motor 25 is determined therefrom and output to the servo motor 25. For a sensitive and rapid regulation the rapid acquisition of the instantaneous angle $\phi$ is required. For the control of the servo motor 25 it is sufficient to know precisely the instantaneous position of the stator (not shown here) with respect to the pole shoes 6 of the stator (not shown here). The total angle $\phi$ over one complete or even several rotations, from which the steering angle can be determined, does not need to be determined with high speed and can be determined by counting the passages through the angular range of the coding length C.

FIG. 2 depicts for example the preferred disposition or the sensor configuration 26 comprised of the support plate 8, connected with the rotatable component, with the two code tracks 4 and 5 with markings 41 and 51, respectively, as well as the rotational axis Z and the sensor unit 3 connected with the non-rotating component and the sensors 1 and 2 disposed thereon. The two sensors are advantageously disposed offset by an angle offset 32. The offset sensor configuration permits better detection of the running direction. Among the non-rotating components are to be counted for example the pole shoes 6 of the stator of the servo motor 25. The zero position of the angle of the system is marked by the zero position 31 on the sensor unit 3 and the zero position 81 of the support plate 8. For clarification of the markings 41 and 51, for example of the alternating North-South pole orientation of a permanent-magnetic track, here the denotations '0' and '1' are chosen in the illustrations or synonymously 0 (in white box) and 1 (in black box) or synonymously 0 (in white box) and ■.

Depicted here is the disposition of the code tracks 4 and 5 codirectional polarity. It is also possible to polarize the two code tracks 4 and 5 in the opposite direction. To clarify the disposition of the code tracks 4 and 5 in the opposite direction, in one of the two tracks only the '1' needs to be exchanged against the '0' label, and the '0' against the '1'.

Each of the markings '0' and '1' have an angle of β/2. One pole pair 0/1 therewith has an angle equal to clock β and corresponds to one bit in the digital further processing of the signals. The coding length C is the angular range for which the angle can be exactly determined after the first passage of the start detection angle Δφ. In the example the angle Δφ corresponds precisely to 4 bits or 4 clocks.

The second code track 5 has the task of specifying the clock β. The clock signal β is generated from the Hall signal 10 of the sensor 2 when the support plate 8 is set into rotation.

As described above, on the first code track 4 an offset δ is introduced in some markings 41, which means one of the polarities, here for example the '1' polarity, is extended by the angle δ.

In the example the servo motor 25 has 8 pole pairs and a coding length of 90°, which corresponds to a length of 16 bits at a start detection angle Δφ of 4 bits, which corresponds to an angle of 16.875°. From the offsets δ are formed the signal code bits 7, which are drawn on for determining the angle φ. Greater word lengths permit better resolution, however at greater expenditure.

FIG. 3a depicts the Hall signal 9 with the signal amplitude I of sensor 1 with respect to the markings 41 of the first code track 4. In FIG. 3b the corresponding Hall signal 10 of sensor 2 is shown with respect to the markings 51 of the second code track 5. Angle φ becomes greater with the rotation in the rotation direction 12. The illustration encompasses a coding length C, which means 16 angles of a '0'/'1' marking 51. A mutual angle offset 32 of the two sensors 1 and 2 is shown by example.

Due to the angle offset 32 of the two sensors 1 and 2, the rotation direction can be determined in simple manner. If the change from '0' to '1' occurs in the Hall signal 9 before the Hall signal 10, the support plate 8 rotates in rotation direction 12. Correspondingly, the support plate rotates counter to rotation direction 12 if the change from '0' to '1' occurs first in the Hall signal 10. The angle offset 32 must for this purpose be less than β/2.

The angle offset 32 is not required for the further analysis, such that it is corrected electronically or numerically. Therefore in all further figures the Hall signals are corrected by the angle offset 32 of the two sensors 1 and 2, i.e. they are shown shifted to an angle offset of 0°.

FIGS. 4a and 4b show the Hall signals 9A and 10A, respectively, of sensors 1 and 2, corrected by the angle offset, plotted over the rotation angle. Furthermore is shown in FIG. 4c the combination signal 11 with the signal peaks 111. Here, as in FIG. 3, are shown the signals for the case that the polarities of the two code tracks are disposed in the same direction. In the simplest case the combination signal can be formed as the difference from the Hall signals 9A and 10A.

Figures 6, 7:
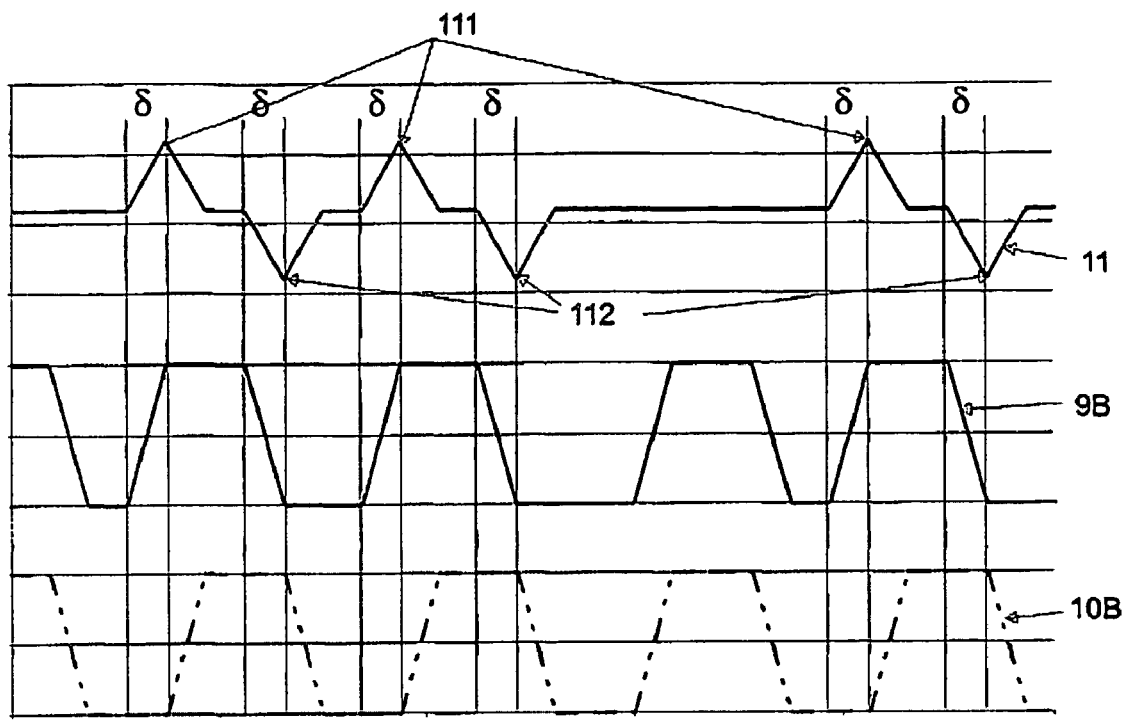

In the next step digitizing of the Hall signals is carried out. The further FIGS. 5 and 6 show a simple digitization to the two threshold values of the signal, for example I signal >0 and I signal <0. To increase the resolution, however, sampling, for example to several threshold values of the Hall signals 9 and 10 can be carried out.

FIGS. 5a and 5b show the digitized Hall signal 9B and 10B of sensors 1 and 2, respectively, plotted over the rotation angle φ and phase-shifted about the angle offset 32 of the two angle sensors. For clarification the markings 41, 51 of the code tracks 4 and 5 are shown. FIG. 5c depicts the digitized combination signal 11 with the signal peaks 111, which result from the angle offsets δ of markings 41 of code track 4. FIG. 5d shows the signal code bits 7, generated from the signal peaks 111, with the values 0 or 1, which are assigned to the particular clock β. Based on the illustration the manner is evident in which, after the passage of the first 4 clocks β, the sequence of signal code bits 7 "1 0 1 0" was generated from the combination signal 11. In our example this value corresponds to precisely 16.875° measured from the start angle 81, 31 or the start angle 81 plus the coding length C (in the example 90°).

The truth table shown in FIG. 7 which is associated with the illustrations in FIGS. 2, 3, 4 and 5, shows the manner in which the angle φ is determined in conjunction with the signal peaks 111 of the combination signal 11 and the associated signal code bits.

In Table 1, the sequence of the angle detection and the structure of the truth table is shown in conjunction with the example depicted in the figures. If the support plate 8 starts to rotate in rotation direction 12 from the zero position 81, 31, the clock β is passed through, i.e. a number of '0'/'1' changes. Clock β corresponds to the angle φ which is here shown in the sequence 5.625°, 11.250°. Through the angle offset δ of the markings the signal peaks 111 in combination signal 11 and consequently the signal code bits 7 are generated. This corresponds to the signal code bits 7 shown in FIG. 5d with the digital values 0 or 1. The store, which in our example has a word length of 4 bits, is filled bit by bit, as shown in the lower portion of Table 1. After passing the angle 16.875°, the store is filled with a complete 4-bit word of the signal code bits 7. From now on, the instantaneous angle value can be read directly from the truth table, as shown in FIG. 7.

TABLE 1

It should be noted that, depending on the rotation direction, the storage into the store must take place either at the highest or the lowest bit of the word in the store while shifting the bits already stored in the store.

| | Start of sequence | | | | | | | | ←———— C ————→ | | | | | | | | Sequence starts again | | | |
|---|---|---|---|---|---|---|---|---|---|---|---|---|---|---|---|---|---|---|---|---|
| Angle (φ) in° | 5.625 | 11.25 | 16.875 | 22.5 | 28.125 | 33.75 | 39.375 | 45 | 50.625 | 56.25 | 61.875 | 67.5 | 73.125 | 78.75 | 84.375 | 90 | 5.625 | 11.25 | 16.875 | 22.5 |
| Clock (β) | 1 | 2 | 3 | 4 | 5 | 6 | 7 | 8 | 9 | 10 | 11 | 12 | 13 | 14 | 15 | 16 | 1 | 2 | 3 | 4 |
| Signal code bit (7) | 1 | 0 | 1 | 0 | 1 | 0 | 1 | 0 | 1 | 1 | 1 | 1 | 0 | 0 | 0 | 0 | 1 | 0 | 1 | 0 |

Detected values (111) i.e. signal code bits (7) after the first passage through the sequence in rotation direction (12) according to FIG. 1

| Angle (φ) in° | Detected signal code bits (7) with 4-bit word length | | | | | | | | | | | | | | | | | | | |
|---|---|---|---|---|---|---|---|---|---|---|---|---|---|---|---|---|---|---|---|---|
| 1×β = 5.625 | 1 | | | | | | | | | | | | | | | | | | | |
| 2×β = 11.250 | 1 | 0 | | | | | | | | | | | | | | | | | | |
| 3×β = 16.875 | 1 | 0 | 1 | | | | | | | | | | | | | | | | | |
| 4×β = 22.500 | 1 | 0 | 1 | 0 | | | | | | | | | | | | | | | | |
| 5×β = 28.125 | | 0 | 1 | 0 | 0 | | | | | | | | | | | | | | | |
| 6×β = 33.750 | | | 1 | 0 | 0 | 1 | | | | | | | | | | | | | | |
| 7×β = 39.375 | | | | 0 | 0 | 1 | 1 | | | | | | | | | | | | | |
| 8×β = 45.000 | | | | | 0 | 1 | 1 | 0 | | | | | | | | | | | | |
| 9×β = 50.625 | | | | | | 1 | 1 | 0 | 1 | | | | | | | | | | | |
| 10×β = 56.250 | | | | | | | 1 | 0 | 1 | 1 | | | | | | | | | | |
| 11×β = 61.875 | | | | | | | | 0 | 1 | 1 | 1 | | | | | | | | | |
| 12×β = 67.500 | | | | | | | | | 1 | 1 | 1 | 1 | | | | | | | | |
| 13×β = 73.125 | | | | | | | | | | 1 | 1 | 1 | 0 | | | | | | | |
| 14×β = 78.750 | | | | | | | | | | | 1 | 1 | 0 | 0 | | | | | | |
| 15×β = 84.375 | | | | | | | | | | | | 1 | 0 | 0 | 0 | | | | | |
| 15×β = 90.000 | | | | | | | | | | | | | 0 | 0 | 0 | 0 | | | | |
| C + 1×β = 95.625 | | | | | | | | | | | | | | 0 | 0 | 0 | 1 | | | |
| C + 2×β = 11.250 | | | | | | | | | | | | | | | 0 | 0 | 1 | 0 | | |
| C + 3×β = 16.875 | | | | | | | | | | | | | | | | 0 | 1 | 0 | 1 | |
| C + 4×β = 22.500 | | | | | | | | | | | | | | | | | 1 | 0 | 1 | 0 |

TABLE 2

In Table 2 the store content is shown during the structuring of the zero position 81, 31 with the word length of 4 bits for the particular clock β/angle φ. As is evident in conjunction with the structuring of Table 1 and Table 2, the word length corresponds also to the number of clocks until the first angle can be unambiguously detected, and therewith to the start detection angle Δφ/β.

|  | Structure of the truth table, passage at initial rotation | | | |
|---|---|---|---|---|
| φ [°] | Detected signal code bits (7) with 4-bit word length | | | |
| 5.625  | -  | -  | -  | 1 |
| 11.250 | -  | -  | 1  | 0 |
| 16.875 | -  | 1  | 0  | 1 |
| 22.500 | 1  | 0  | 1  | 0 |
| 28.125 | 0  | 1  | 0  | 0 |
| 33.750 | 1  | 0  | 0  | 1 |
| 39.375 | 0  | 0  | 1  | 1 |
| 45.000 | 0  | 1  | 1  | 0 |
| 50.625 | 1  | 1  | 0  | 1 |
| 56.250 | 1  | 0  | 1  | 1 |
| 61.875 | 0  | 1  | 1  | 1 |
| 67.500 | 1  | 1  | 1  | 1 |
| 73.125 | 1  | 1  | 1  | 0 |
| 78.750 | 1  | 1  | 0  | 0 |
| 84.375 | 1  | 0  | 0  | 0 |
| 90.000 | 0  | 0  | 0  | 0 |
| 5.625  | 0  | 0  | 0  | 1 |
| 11.250 | 0  | 0  | 1  | 0 |
| 16.875 | 0  | 1  | 0  | 1 |
| 22.500 | 1  | 0  | 1  | 0 |

C

FIG. 8 shows also several patterns of truth tables as examples of the manner in which for different coding lengths C and start detection angles Δφ with the associated word lengths Δφ/β a sequence of signal code bits 7 can be defined, so that, after the initial passage of start detection angle Δφ, with each further passage of angle β the absolute value of the rotational angle can be determined.

Figures 8A, 8B, 8C, 8D:
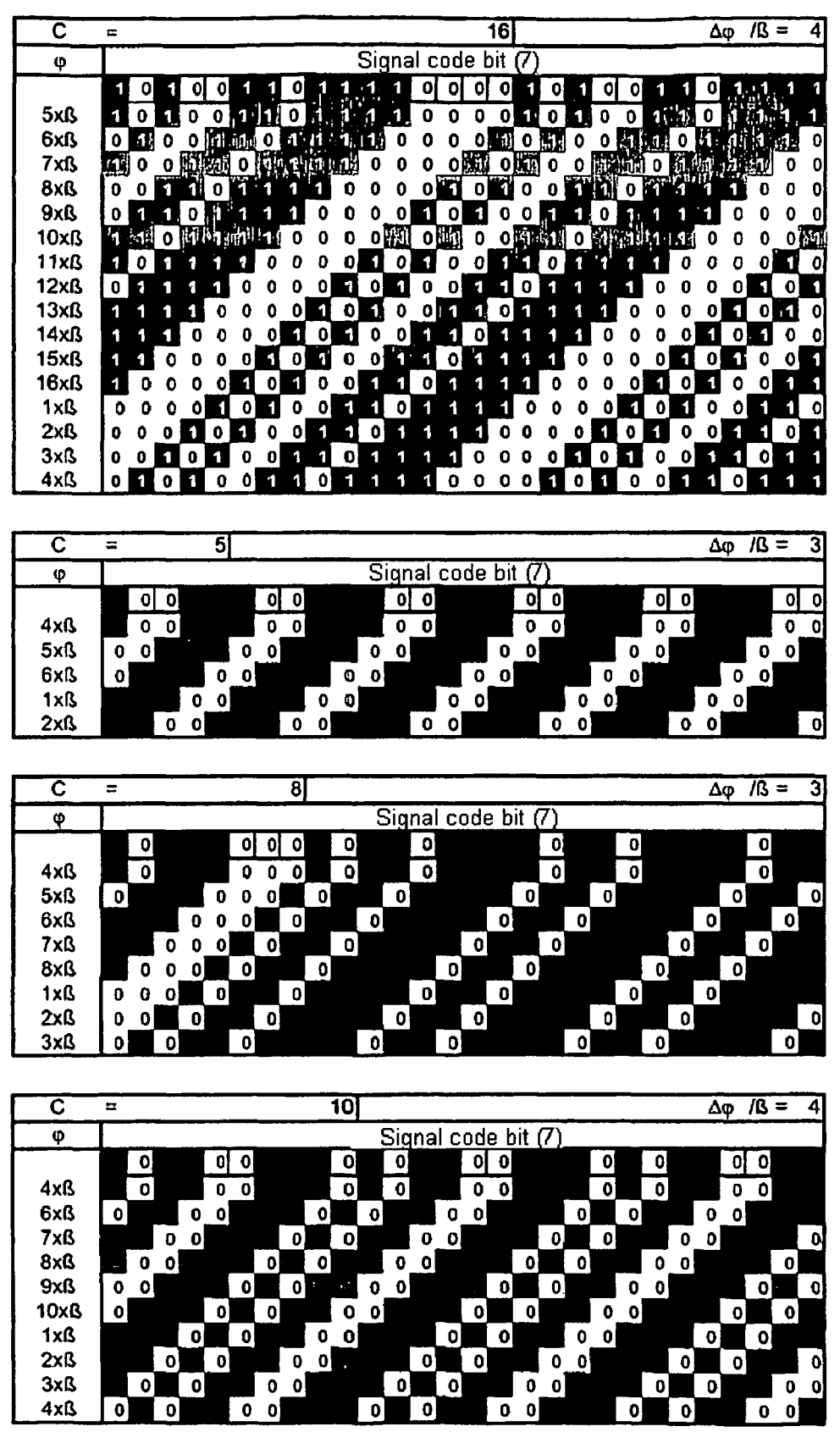

Our example is once again shown in FIG. 8a. In FIGS. 8b, 8c, and 8d illustrations of the coding lengths of 5, 8 and 10 and word lengths of 3 bits, 3 bits and 4 bits, respectively, are given.

Based on the examples with the Tables, it is evident that the successive bit patterns, offset by angle β, are selected such that these are always unambiguous and appear as unique patterns, thus are non-recurrent, wherewith a unique angle position detection is possible at any time by comparing the measured patterns with the stored patterns.

FIG. 6 depicts for another example the digitized Hall signal 9B of sensor 1 and the digitized Hall signal 10B of sensor 2 over the angle of rotation and shifted in phase by the angle offset 32 of the two angle sensors. However, the markings are here so offset by angle δ that a combination signal 11 with positive signal peaks 111 and negative signal peaks 112 is generated. From the time sequence of the occurrence of the positive signal peak 111 and the negative signal peak 112 the direction of rotation is determined. If the positive signal peak 111 occurs before the negative signal peak 112, the support plate 8 rotates in rotation direction 12. If the negative signal peak 112 occurs before the positive signal peak 111, the support plate 8 rotates counter to the rotation direction 12.

In the event it cannot be decided which signal peak 111 or 112 occurs earlier, the signal edge of signal 9B is also utilized. If the signal 9B rotates from the low to the high value and if simultaneously the positive signal peak 111 is detected, the support plate rotates in rotation direction 12. However, if the negative signal peak 112 is determined simultaneously, the support plate rotates counter to the rotation direction 12.

In the especially cost-effective further development of the system the sensor 2 is omitted and the clocking signal 10B resulting therefrom is determined numerically from the elapsed time and the '0'/'1' changes of the signal 9B, as already described above. In this way, the clocking signal 10B can be mathematically generated and all procedures described above for determining the angle can be applied.

However, the application of this cost-effective further development brings about the degradation of the resolution, since at least three and rather more '0'/'1' changes are required for determining the digitized (clock) signal 10B.

Very good results can be obtained at a mean reading radius of approximately 42 mm and a magnetic pole distance of 1.5 to 3.5 mm. Thus 64 pole changes of the magnetic field can be represented. This means 64 complete periods of the Hall signal. At a sampling rate of 1/32 this yields 4096 edge changes for each digitized signal 9B or 10B. Since two coding tracks are available, overall 8192 edge changes result. This yields an angular resolution of the system of approximately 0.044°.

To improve the resolution, via a gearing with a gear transmission ratio, to the rotatable component can be coupled a component rotating at a higher rotational speed, with which in this case the carrier plate 8 is connected. In this manner with the same number of permanent magnets and Hall sensors the angular resolution can be increased by the transmission factor of the gearing.

It is evident that all of the above described embodiments can also be transferred to optical, electrical, inductive or capacitive transducers. Moreover, lengths can also be measured in the same manner.

A special application case comprises the application of the above described arrangement for the regulated control of an electric motor or servo motor 25 for the driving of a steering system for motor vehicles with electric power assist. In this case the problem consists of ensuring the commutation of the current flow depending on the angular position of the rotor with respect to the stator of the servo motor 25. The current flow must be switched over so smoothly that no irregular moment of torsion is output by the electric motor. For this purpose the support plate 8 is coupled with the rotor and the sensor unit with the stator of the electric motor. With the aid of the measurement result the position of the rotor with respect to the pole shoes of the stator is subsequently determined. The coding length C and the clock β must be defined according to the angle between the pole shoes 6.

The invention claimed is:

1. An electric servo steering arrangement (29) for motor vehicles with a rotational angle sensor configuration (26) for acquisition of a position of a steering movement comprising:
a support plate (8) which has rotational axis (Z) and which rotates relative to the steering movement, with at least one code track (4) and only one stationary sensor (1) acting on each code track (4), wherein the code track (4) is disposed circularly about the rotational axis (Z) of the support plate (8) and comprises a plurality of markings (41) for generating a sequentially changing bit pattern wherein 360° of the circumference of the code track, divided by the number of markings (41) on the circumference defines a clock angle (β), and wherein the markings (41), aside from selected predetermined positions around the circumference, change alternately between '1' and '0' in precisely equidistant angular spacings, and wherein in the selected predetermined positions the markings (41) are arranged in a phase-shifted disposition with respect to the fixed division of the clock angle (β) whereas a '1'/'0' bit pattern with respect to the clock angle (β) changes to be delayed and that the next following change of the markings is not arranged in a phase-shifted disposition with respect to the fixed division of the clock angle (β) whereby a defined pattern is created with only the one stationary sensor (1) acting on each code track (4).

2. An arrangement as claimed in claim 1, wherein the one stationary sensor detects a condition of change at a transition from one marking (41) to a next other marking (41) for determining the position of the transition within the clock angle (β).

3. An arrangement as claimed in claim 1, wherein the markings (41) are disposed at a partitioning of half a clock angle (β/2).

4. An arrangement as claimed in claim 1, wherein concentrically with the first code track (4) is provided a second clocking reference code track (5) and one single stationary sensor (2) operating on the second code track (5), the second code track (5) being developed with the same number of markings (51) as the first code track (4), and markings of the second code track being disposed equidistantly over the circumference and each marking of the second code track determining the clock angle (β).

5. An arrangement as claimed in claim 4, wherein the two sensors (1, 2) operating on the code tracks (4, 5) are disposed such that they are offset by a fixed angle (32) which is one half of the clock angle (β).

6. An arrangement as claimed in claim 1, wherein the bit pattern determined by the phase-shifted disposition of markings (41) on the code track (4) during the rotation of the support plate (8) within a fixedly specified angular range (C) which encompasses the full 360° or only a portion thereof, changes after each passage of a further clock angle (β).

7. An arrangement as claimed in claim 6, wherein the signal code bits (7), generated by the bit pattern, with a fixedly specified word length of between 3 and 4 yields a data word which unambiguously assigned to a fixed number of clocks of the clock angle (β) within the fixedly specified angular range (C), and consequently to a defined angle (φ).

8. An arrangement as claimed in claim 1, wherein the bit pattern (7) determined by the phase-shifted disposition of markings on the code track (5) is changed after each clock angle (β) and is unambiguous and unique and singular, wherewith the position is unambiguously identifiably defined.

9. An arrangement as claimed in claim 1, wherein the code track (4, 5) and the sensor (1,2) comprise magnetic means for defining and detecting the markings (41,51).

10. An arrangement as claimed in claim 9, wherein the code track (4, 5) and the sensor (1,2) comprise optical means for defining and detecting the markings (41, 51).

11. An arrangement as claimed in claim 9, wherein the code track (4, 5) and the sensor (1,2) comprise capacitive means for defining and detecting the markings (41, 51).

12. An arrangement as claimed in claim 9, wherein the code track (4, 5) and the sensor (1,2) comprise inductive means for defining and detecting the markings (41, 51).

13. An arrangement as claimed in claim 1, further comprising electronic means (28, 281,282,283) for controlling and analyzing the rotational angle sensor configuration (26).

14. An arrangement as claimed in claim 13, wherein the singular patterns of the signal code bits (7) are deposited in an electronic store as a reference with the associated angular position of the support plate (8).

15. An arrangement as claimed in claim 14, wherein electronic means are provided for the control and regulation as a function of the position of the angle of rotation of an electrically commutated motor (25) of the servo steering arrangement (29).

16. An arrangement as claimed in claim 15, further comprising a gearing (27) which comprises a ball screw (27), wherein said ball screw is operationally connected with the electrically commutated motor (25).

17. A method for determining an angle in an electric servo steering arrangement (29) for motor vehicles by means of a rotational angle sensor configuration (26) for acquiring the position of the steering movement, such configuration comprising a support plate (8) which has a rotational axis (Z) and which rotates, relative to the steering movement, with at least one code track (4) and only one stationary sensor (1) operating on each code track (4), wherein the code track (4) is disposed circularly about the rotational axis (Z) of the support plate (8) and comprises markings (41) for the generation of a successively changing bit pattern wherein the 360° of the circumference divided by the number of markings (41) on the circumference defines a clock angle (β), wherein the markings (41), aside from some predetermined positions, are changing alternating from '1' to '0' in precisely equidistant angular spacings and that in some predetermined positions the markings (41) are arranged in a phase-shifted disposition with respect to the fixed division of the clock angle (β) whereas the '1'/'0' bit pattern with respect to the clock angle (β) changes delayed and that the next following change of the markings will not be arranged in a phase-shifted disposition with respect to the fixed division of the clock angle (β) whereby a defined pattern will be created and whereas to a single code track (4) a single sensor (1) will be assigned, whereas the bit pattern, determined by a phase-shifted disposition of markings (41) with respect to the fixed division of the clock angle (β), is read out with a sensor (1) by acquiring the position, after rotation of the support plate about one or several clock angles (β) in either direction of rotation a signal code bit (7) is determined for each clock angle by comparison with the fixed clock angle (β), the sequence of signal code bits (7) is stored in a first store with a fixedly specified but freely selectable word length of two or more bit word length, the stored signal code bits (7) are analyzed in conjunction with a fixedly specified rule, with which an assignment between angle of rotation and position is determined, and therefrom the angle of rotation is determined.

\* \* \* \* \*